Sept. 2, 1941.    G. C. MIDDLETON    2,254,825
TRAP SETTING TOOL
Filed Jan. 15, 1941    2 Sheets-Sheet 1
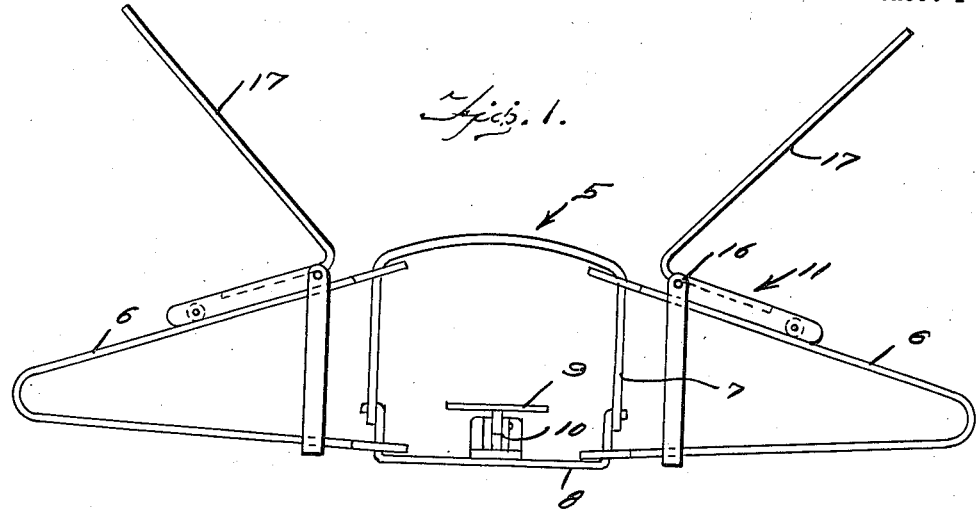
Fig. 1.
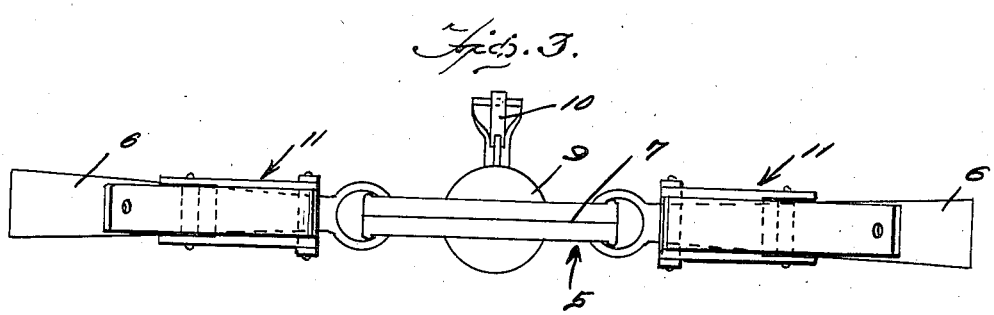
Fig. 3.
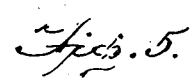
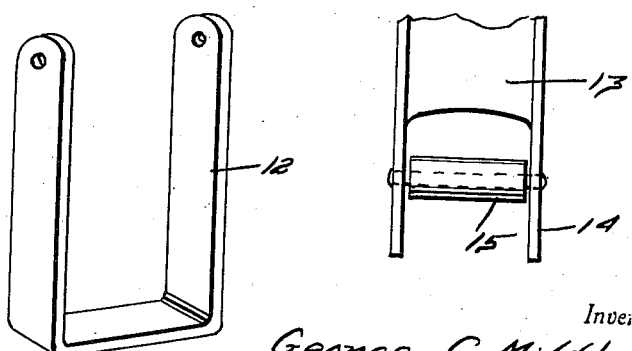
Fig. 5.
Fig. 6.
Inventor
George C. Middleton
By Clarence A. O'Brien
Attorney

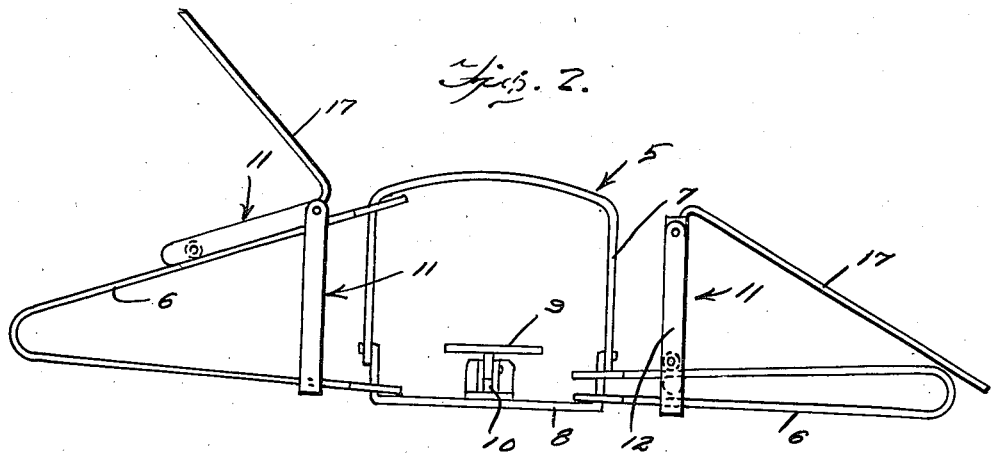
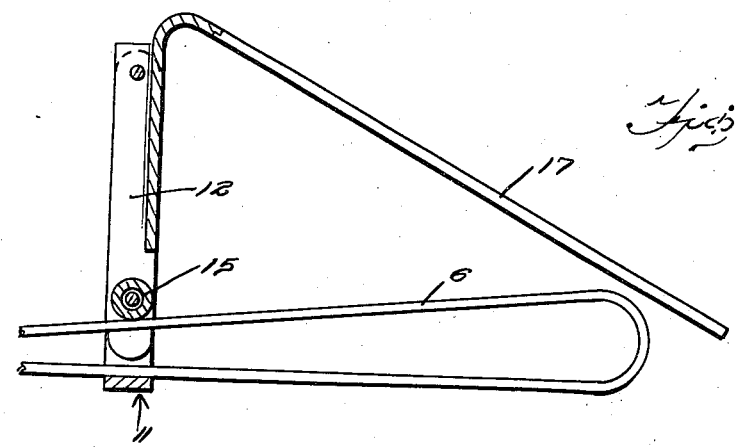
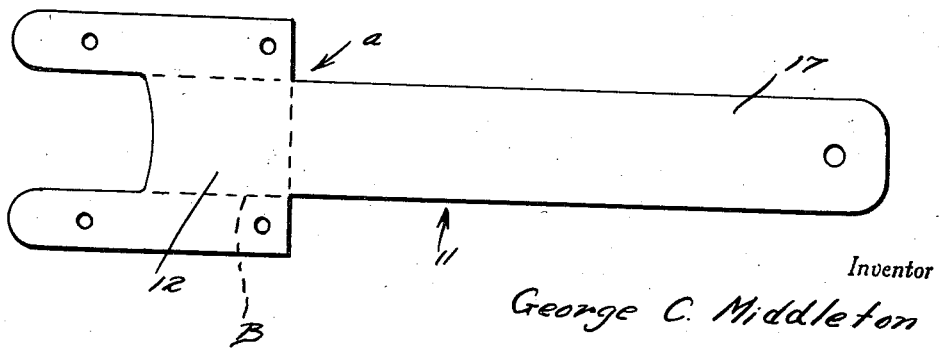

Patented Sept. 2, 1941

2,254,825

UNITED STATES PATENT OFFICE 2,254,825

TRAP SETTING TOOL

George C. Middleton, Deming, N. Mex.

Application January 15, 1941, Serial No. 374,572

3 Claims. (Cl. 43—97)

This invention relates to a trap setting tool, and has for the primary object the provision of a device of this character which is especially adapted for compressing and holding the spring of a trap, known as a steel trap, in order that the jaws thereof may be easily and quickly brought into position to effect setting of the trap with complete safety and with a minimum effort on the part of the trapper.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a jaw type trap shown in a non-set position with the present invention adapted thereto.

Figure 2 is a view similar to Figure 1 showing one of the springs compressed and held in said position by the present invention.

Figure 3 is a top plan view of the trap prior to setting with the tools applied thereto.

Figure 4 is an enlarged fragmentary side elevation partly in section showing one of the springs of the trap compressed by the present invention.

Figure 5 is a fragmentary front elevation showing a spring engaging roller and a portion of the pivoted arm of the tool.

Figure 6 is a perspective view illustrating a supporting bracket.

Figure 7 is a plan view illustrating the blank from which the pivoted arm and lever are made.

Referring in detail to the drawings, the numeral 5 indicates a conventional type of jaw trap employing a pair of substantially V shaped springs 6 for the actuation of the pivotal jaws 7 thereof. The jaws 7 are pivoted on a base 8 in the usual manner and on which is mounted the usual treadle 9 and latch mechanism 10 for holding the jaws spread or in set position. It is a well known fact that it is difficult, if not dangerous, to set a trap of this kind owing to the fact that both of the springs 6 must be compressed and held in said position and the jaws brought into open position and engaged with the latch mechanism. To facilitate this operation and permit it to be carried out with safety, it is proposed to employ tools constructed in accordance with the present invention and which are indicated in entirety by the character 11. As each tool is identical in construction, reference to one specifically is thought sufficient to both.

A substantially U shaped bracket 12 is employed in the construction of the present invention and has pivoted thereto an arm 13 including a bifurcated portion 14 to which is journaled a roller 15. The pivot of the arm 13 on the bracket 12 is indicated by the character 16.

Formed integrally with the pivoted end of the arm 13 and extending at substantially right angles thereto is a lever 17.

As shown in Figure 7 it is preferable that the arm and lever be constructed from a single piece of material. It will be noted in the blank that the enlarged portion A thereof is bent on the lines B in constructing the arm 13 so that the latter will be of channeled formation.

When setting a trap including a pair of springs, a pair of tools are employed. The supporting brackets 12 are positioned to underlie and also straddle the springs, as clearly shown in Figure 1, with the arms 13 resting against the upper portions of the springs. The levers 17 are then swung downwardly compressing the springs bringing the upper portions of the springs below the pivots of the jaws so that said jaws may be separated to assume horizontal position and engaged by the latch mechanism of the treadle 9. When the levers 17 are swung downwardly, the arms 13 assume substantially vertical positions acting with the brackets 12 in forming clamps to hold the springs in compressed position so that the hands of the operator may be left free to actuate the jaws and latch mechanism in the setting of the trap in the usual way. After the jaws have been latched into set position, the tools are removed from the springs. It is to be understood that when the trap only employs one spring then it is only necessary to employ a tool on that spring for the convenient and quick setting of the trap.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a trap setting tool, a substantially U-shaped bracket to straddle a spring of a trap and including a connecting portion and parallel vertically arranged arms, an arm pivoted to the first-named arms and having a bifurcated portion, a roller journaled to said bifurcated portion to engage the spring, and means to permit a person to pivot said second-named arm for compressing the spring and to bring said second-named arm into substantially parallelism with the first-named arms to coact therewith in clamping the spring in a compressed position.

2. In a trap setting tool, a substantially U-shaped bracket to straddle a spring of a trap and including a connecting portion and parallel vertically arranged arms, an arm pivoted to the first-named arms and having a bifurcated portion, a roller journaled to said bifurcated portion to engage the spring, and a lever formed on the pivoted end of the second-named arm and extending at substantially right angles thereto to permit a person to move the second-named arm on its pivot for compressing the spring and for positioning the second-named arm in substantially parallelism with the first-named arms to coact therewith in clamping the spring in a compressed position.

3. In a trap setting tool, a supporting bracket to straddle a V type spring of a trap, an arm pivoted on said bracket and engaging the spring in a position angularly to said bracket, and a handle on said arm for manually moving the arm into substantially parallel position with the bracket for compressing the spring and bringing the handle into engagement with said spring whereby the spring will be held compressed without manual effort.

GEORGE C. MIDDLETON.